United States Patent
Porikli et al.

(10) Patent No.: US 7,006,572 B2
(45) Date of Patent: Feb. 28, 2006

(54) METHOD AND APPARATUS FOR DECODING VIDEO BITSTREAMS TO REDUCED SPATIAL RESOLUTIONS

(75) Inventors: Fatih M. Porikli, North Plainfield, NJ (US); Huifang Sun, Murray Hill, NJ (US)

(73) Assignee: Mitsubishi Electric Research Labs, Inc., Cambridge, MA (US)

(*) Notice: Subject to any disclaimer, the term of this patent is extended or adjusted under 35 U.S.C. 154(b) by 561 days.

(21) Appl. No.: 10/141,742

(22) Filed: May 9, 2002

(65) Prior Publication Data

US 2003/0210744 A1 Nov. 13, 2003

(51) Int. Cl.
*H04N 7/12* (2006.01)
(52) U.S. Cl. .............................. 375/240.16
(58) Field of Classification Search ........... 375/240.01, 375/240.25, 240.24, 240.2, 240.21, 240.16; 348/408.1
See application file for complete search history.

(56) References Cited

U.S. PATENT DOCUMENTS

| | | | |
|---|---|---|---|
| 5,253,055 A * | 10/1993 | Civanlar et al. | 375/240.24 |
| 5,253,056 A * | 10/1993 | Puri et al. | 375/240.01 |
| 5,278,646 A * | 1/1994 | Civanlar et al. | 375/240.25 |
| 5,500,678 A * | 3/1996 | Puri | 348/408.1 |
| 5,563,593 A * | 10/1996 | Puri | 341/67 |
| 5,737,019 A * | 4/1998 | Kim | 375/240.25 |
| 5,926,573 A | 7/1999 | Kim et al. | 382/239 |
| 6,005,623 A | 12/1999 | Takahashi et al. | 348/402 |
| 6,025,878 A | 2/2000 | Boyce et al. | 348/402 |
| 6,104,434 A | 8/2000 | Nakagawa et al. | 348/403 |
| 6,184,935 B1 * | 2/2001 | Iaquinto et al. | 348/441 |
| 6,243,421 B1 * | 6/2001 | Nakajima et al. | 375/240.25 |
| 6,301,299 B1 * | 10/2001 | Sita et al. | 375/240.01 |
| 6,487,249 B1 * | 11/2002 | Kim et al. | 375/240.21 |
| 6,748,018 B1 * | 6/2004 | Sato et al. | 375/240.21 |
| 6,763,070 B1 * | 7/2004 | Lee | 375/240.2 |

* cited by examiner

*Primary Examiner*—Nhon Diep
(74) *Attorney, Agent, or Firm*—Dirk Brinkman; Andrew J. Curtin (57) ABSTRACT

A method decodes a video encoded as a compressed bitstream including frames constructed as blocks. The bitstream is variable length decoded and inverse quantized to determine motion vectors and DCT coefficients of the blocks of the bitstream. The DCT coefficients are then inverse discrete cosine transformed. A low-resolution block is generated for each reconstructed block, and the reconstructed blocks are motion compensated with the low-resolution blocks to decode the video.

9 Claims, 10 Drawing Sheets

METHOD AND APPARATUS FOR DECODING VIDEO BITSTREAMS TO REDUCED SPATIAL RESOLUTIONS

FIELD OF THE INVENTION

This invention relates generally to the field of decoding compressed video bitstreams, and more particularly to using reduced resolution frames while decoding compressed video bitstreams.

BACKGROUND OF THE INVENTION

Discrete Cosine Transform

A discrete cosine transform (DCT) is an orthonormal, separable, frequency basis similar to a Fourier transform. The introduction of the DCT was an important advance for image compression. The DCT can be regarded as a discrete-time version of the discrete Fourier-cosine transform (DFT). Unlike the DFT, the DCT is real-valued and provides a better approximation of a signal with fewer coefficients. With the DCT, each block of an image is transformed into a block of coefficients.

The DCT is widely used in image compression applications. For example, a 2D DCT is used for still image compression, moving image compression, and video-telephony coding techniques. Image compression standards are described in greater detail below. The energy compaction property of the DCT is well suited for image compression because in most images the energy is concentrated in the low to middle frequencies to which the human visual system is more sensitive.

The DCT helps separate the image into spectral sub-bands of differing importance with respect to the image's visual quality. The DCT is similar to the DFT in that the DCT transforms a signal or image from the spatial domain to the frequency domain.

For an M×N input image y, the two-dimensional DCT coefficients of the output Y are defined as:

$$Y(u, v) = \frac{2c_u c_v}{\sqrt{M} \sqrt{N}} \sum_{m=0}^{M-1} \sum_{n=0}^{N-1} y(m, n) F_{2M}^u(m) F_{2N}^v(n),$$

where the multipliers are $$F_\beta^\alpha(\lambda) = \cos\left(\frac{2\lambda + 1}{\beta} \alpha \pi\right),$$

and $$c_k = \begin{cases} \frac{1}{\sqrt{2}} & k = 0 \\ 1 & k \neq 0, \end{cases}$$

where:
M=Number of rows in the input data set,
N=Number of columns in the input data set,
m=Row index in the spatial domain $0 \leq m \leq M-1$,
n=Column index in the spatial domain $0 \leq n \leq N-1$,
y(m,n)=Spatial domain data,
u=Row index in the frequency domain,
v=Colume index in the frequency domain, and
Y(u,v)=Frequency domain coefficient.

In the above equation, the input signal or original image in the spatial domain is y(m, n) is, and Y(u, v) is the output signal or converted image in the frequency domain. The function F(.) is used to simplify the notation.

The inverse of the function in the above equation can be used to reconstruct a signal in the spatial domain. Thus, the two-dimensional inverse DCT (2D IDCT) is defined as follows:

$$y(m, n) = \frac{2}{\sqrt{M} \sqrt{N}} \sum_{u=0}^{M-1} \sum_{v=0}^{N-1} c_u c_v Y(u, v) F_{2M}^u(m) F_{2N}^v(n).$$

For many applications of interest, M and N have the same value. Substituting M=N in the first equation gives:

$$Y(u, v) = \frac{2c_u c_v}{N} \sum_{m=0}^{N-1} \sum_{n=0}^{N-1} y(m, n) F_{2N}^u(m) F_{2N}^v(n).$$

This equation defines an N×N point DCT function. In many applications, such as video compression, the input video signal is usually partitioned into basic square blocks, and the DCT is performed on these blocks of data. The 8×8 block DCT is most commonly used in image compression applications because it offers a reasonable trade-off between computational complexity and compression efficiency. Substituting N=8 in the last equation (3) results in the following function:

$$Y(u, v) = \frac{c_u c_v}{4} \sum_{m=0}^{7} \sum_{n=0}^{7} y(m, n) F_{16}^u(m) F_{16}^v(n).$$

Note that the above cosine functions F(.) are not data dependent, although they depend on the dimension of the input data. In case of a fixed input block size of 8× 8, the cosine values can be pre-calculated, depending on the DCT process used for a particular implementation.

Video Compression Standards

Video compression enables the storing, transmitting, and processing of visual information with fewer storage, network, and processor resources. The Moving Pictures Experts Group (MPEG) of the International Standards Organization (ISO) generates standards for digital video compression, i.e., a temporal sequence of images or "frames," and audio compression. In particular, MPEG defines a standard compressed bitstream, which implicitly defines encoders, decoders, and transcoders.

For video signals, MPEG compression removes spatial redundancy within a video frame and temporal redundancy between video frames. As in the JPEG standard for still image compression, DCT-based compression, as described above, is used to reduce spatial redundancy. Motion-compensation is used to exploit temporal redundancy. The images in a video stream usually do not change much during small time intervals. The idea of motion-compensation is to base the encoding of a video frame on other temporally adjacent frames.

The most widely used video compression standards include MPEG-1 for storage and retrieval of moving pictures. MPEG-1 allows analog video and audio signals to be compressed by the ratios in the range of 50:1 to 100:1, depending on the complexity of the input signal and desired quality. MPEG-2 is used for digital television. MPEG-2 enables high-quality video compression at higher data rates than MPEG-1. The H.263 standard is used for video conferencing, see ISO/IEC 11172-2:1993, "Information Technology—Coding of Moving Pictures and Associated Audio for Digital Storage Media up to about 1.5 Mbit/s—Part 2: Video," D. LeGall, "MPEG: A Video Compression Standard for Multimedia Applications," Communications of the ACM, Vol. 34, No. 4, pp. 46–58, 1991, ISO/IEC 13818-2:1996, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+Q15-A-60 rev.0, "Video Coding for Low Bitrate Communication," 1997.

These standards are relatively low-level specifications that primarily deal with a spatial compression of images or frames, and the spatial and temporal compression of sequences of frames. As a common feature, these standards perform compression on a per frame basis. With these standards, one can achieve high compression ratios for a wide range of applications.

Newer video coding standards, such as MPEG-4 for multimedia applications, see ISO/IEC 14496-2:1999, "Information technology—coding of audio/visual objects, Part 2: Visual," allow arbitrary-shaped objects to be encoded and decoded as separate video object planes (VOP). The objects can be visual, audio, natural, synthetic, primitive, compound, or combinations thereof. Also, there is a significant amount of error resilience features built into this standard to allow for robust transmission across error-prone channels, such as wireless channels.

The emerging MPEG-4 standard is intended to enable multimedia applications, such as interactive video, where natural and synthetic materials are integrated, and where access is universal. In the context of video transmission, these compression standards are needed to minimize the resources used, such as network bandwidths, memories, and processors.

A great deal of effort has been placed on systems and methods that enable devices to transmit the content robustly and to adapt the quality of the content to the available resources. When the content is encoded, it is sometimes necessary to further transcode the bitstream before it is transmitted through the network at a lower bit-rate or a lower spatial resolution bitstream.

Compressed Video Bitstreams

A video bitstream is a sequence of video frames. Each frame is a still image. A video player displays one frame after another, usually at a rates close to thirty frames per second (fps), 23.976, 24, 25, 29.97, or 30 fps.

Pixels of frames are digitized in a standard RGB format, 24 bits per pixel, i.e., 8 bits each for the red, green, and blue channel. MPEG-1 is designed to produce bit rates of 1.5M bps or less, and is intended to be used with images of size 352×288 at 24–30 fps. This results in data rates of 55.7–69.6 M bps.

MPEG-1 operates on images represented in YUV color space (Y, Cr, Cb). If an image is represented in RGB format, then the image must first be converted to YUV format. In YUV format, images are also represented in 24 bits per pixel with 8 bits for the luminance information (Y), and 8 bits each for the two chrominance information (U and V)). The YUV format is subsampled. All luminance information is retained. However, chrominance information is subsampled 2:1 in both the horizontal and vertical directions. Thus, there are two bits each per pixel of U and V information. This subsampling does not drastically affect quality because the human visual system is more sensitive to luminance than to chrominance information. Subsampling is a lossy compression. The 24 bits RGB information is reduced to 12 bits of YUV information, which automatically gives the 2:1 compression. Technically speaking, MPEG-1 is 4:2:0 YCrCb.

Frames can be partitioned into 16×16 pixel macroblocks, and each macroblock has four 8×8 luminance blocks and two 8×8 chrominance blocks, i.e., one for U and one for V. Macroblocks are the units for motion-compensated compression. Blocks are used for DCT compression.

Frame Types

In the compressed domain, frames can be encoded according to three types: intra-frames (I-frames), forward predicted frames (P-frames), and bi-directional predicted frames (B-frames).

I-Frame

An I-frame is encoded as a single image, with no reference to any past or future frames. The encoding scheme used is similar to JPEG compression. Each 8×8 block is encoded independently, with one exception described below. The block is first transformed from the spatial domain into the frequency domain using the DCT, which separates the signal into independent frequency bands. Most frequency information is in the upper left corner of the resulting 8×8 block. After this, the data are quantized according to a quantizing parameter (QP).

Quantization

Quantization can be thought of as ignoring lower-order bits, though in reality this process is more complicated. Quantization is the only lossy part of the whole compression process, other than subsampling. The resulting data are then run-length encoded in a zig-zag order to optimize compression. This zig-zag ordering produces longer runs of 0's by taking advantage of the fact that there should be little high-frequency information, i.e., a greater number of 0's, as one zig-zags from the upper left corner towards the lower right corner of the 8×8 block. The exception to independence is that the coefficient in the upper left corner of the block, which is called the DC coefficient, is encoded relative to the DC coefficient of the previous block as in differential pulse code modulation (DCPM) coding.

P-Frame

A P-frame is encoded relative to the past reference frame. A reference frame is a P- or I-frame. The past reference frame is the closest preceding reference frame in time. Each macroblock in a P-frame can be encoded either as an I-macroblock or as a P-macroblock. An I-macroblock is encoded just like a macroblock in an I-frame. A P-macroblock is encoded as a 16×16 area of the past reference frame, plus an error term. To specify the 16×16 area of the reference frame, a motion vector is included.

Motion Vector

A motion vector (0, 0) means that a 16×16 area is in the same position as the macroblock being encoded. Other motion vectors are relative to the position of that block. Motion vectors may include half-pixel values, in which case pixels are averaged. The error term is encoded using the DCT, quantization, and run-length encoding. A macroblock may also be skipped which is equivalent to a (0, 0) vector and an all-zero error term. A search for a good motion vector i.e., the one that gives a small error term and good compression, is at the core heart of any MPEG video encoder. This search is the primary factor to impacts the performance of encoders.

B-Frame

A B-frame is encoded relative to the past reference frame, the future reference frame, or both frames. The future reference frame is the closest following reference frame (I or P). The encoding for B-frames is similar to P-frames, except that motion vectors can refer to areas in the future reference frames. For macroblocks that use both past and future reference frames, the two 16×16 areas are averaged.

A number of techniques are know in the prior art for reducing the spatial resolution of video signals, see U.S. Pat. No. 5,737,019 "Method and apparatus for changing resolution by direct DCT mapping," U.S. Pat. No. 5,926,573 "MPEG bit-stream format converter for changing resolution," U.S. Pat. No. 6,025,878 "Method and apparatus for decoding both high and standard definition video signals using a single video decoder," U.S. Pat. No. 6,005,623 "Image conversion apparatus for transforming compressed image data of different resolutions wherein information is scaled," U.S. Pat. No. 6,104,434 "Video coding apparatus and decoding apparatus"

For MPEG-2, Sun et al., in "Architectures for MPEG compressed bitstream scaling," IEEE Transactions on Circuits and Systems for Video Technology, April 1996, described four methods of rate reduction, with varying complexity and architecture. A number of transcoders are described by Vetro et al., in U.S. patent application Ser. No. 09/853,394, "Video Transcoder with Spatial Resolution Reduction, filed on May 5, 2001, also see Assuncao et al., "A frequency domain video transcoder for dynamic bit-rate reduction of MPEG-2 bitstreams," by IEEE Transactions on Circuits and Systems for Video Technology, pp. 953–957, 1998.

Many of these methods produce bitstreams at a reduced spatial resolution reduction that lack quality, or are accomplished with high complexity. Also, proper consideration has not been given to the means by which reconstructed macroblocks are formed. This can impact both the quality and complexity, and is especially important when considering reduction factors different than two. Moreover, some of these methods do not specify any architectural details. Most of the attention is spent on various means of scaling motion vectors by a factor of two.

Therefore, it is desired to provide a method for decoding video bitstreams that overcomes the problems of the prior art methods for spatial resolution reduction. Furthermore, it is desired to provide a balance between complexity and quality in the decoder.

SUMMARY OF THE INVENTION

The method and apparatus according to the invention takes as input a compressed video bitstream and reconstructs the video using low-resolution reference frames in order to accommodate constraints of a limited size frame memory. By using a constrained discrete cosine transform (CDCT), and indexing methods, the original frame is cosine transformed and saved into the frame memory.

The invention uses a modified version of the discrete cosine transform. The modified DCT according to the invention only determines specified coefficients with a pattern generator. The pattern generator provides ordering of the coefficients with respect to a shape function. The shape function is designed to be diagonally symmetric, and it selects DCT coefficients that correspond to vertical and horizontal spatial frequencies to provide the best visual quality while satisfying the memory size constraints.

When reconstructing a next frame during the decoding process, the transformed coefficients are read from the frame memory, and a reference frame is constructed by inverse indexing, followed by an inverse discrete cosine transform.

More particularly, a method decodes a video encoded as a compressed bitstream including frames constructed as blocks.

The bitstream is variable length decoded and inverse quantized to determine motion vectors and DCT coefficients of the blocks of the bitstream.

The DCT coefficients are then inverse discrete cosine transformed. A low-resolution block is generated for each reconstructed block, and the reconstructed blocks are motion compensated with the low-resolution blocks to decode the video.

DETAILED DESCRIPTION OF THE PREFERRED EMBODIMENT

System Structure

Figure 1:
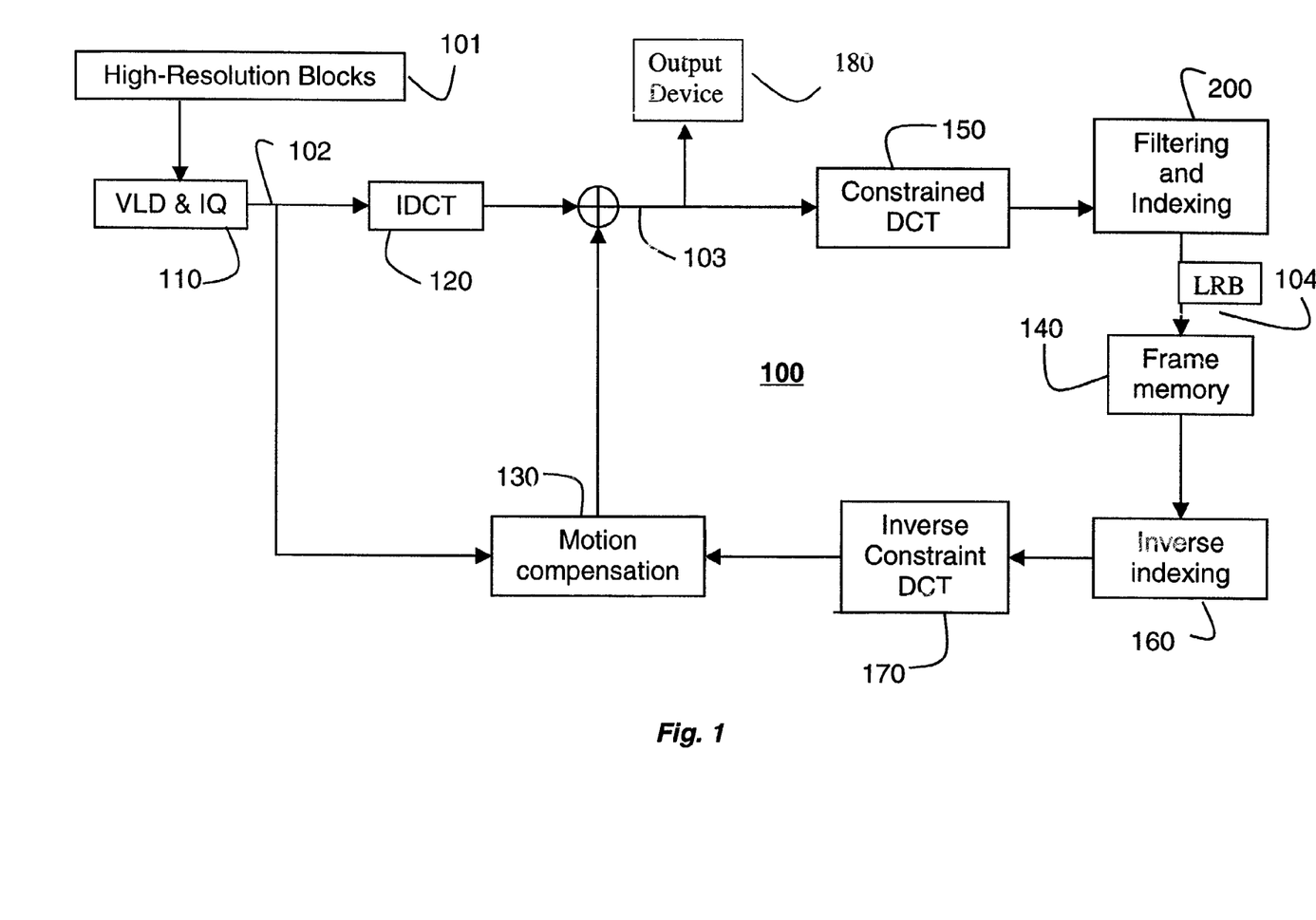
FIG. 1 is a block diagram of a video transcoder according to the invention.

FIG. 1 shows the method and apparatus 100 for decoding a compressed video bitstream according to the invention. In a preprocessing step, a high-resolution compressed video bitstream, e.g., MPEG, is parsed into separate audio and video streams, as well as headers. High-resolution blocks 101 are passed through a variable length decoder (VLD) and inverse quantizer (IQ) 110 to determine motion vectors and block-wise DCT coefficients 102. The VLD translates variable-length symbols of the bitstream into constant-length symbols.

During encoding of the input bitstream, data representing a temporal difference between two frames was transformed using DCT. High frequency components of the video have been limited using quantization. In reverse order, the inverse quantization and an inverse discrete cosine transformation (IDCT) 120 decode this data. A motion compensation block 130 reconstructs each block of the video frame from the decoded data and motion vector information decoded from the variable length decoded bitstream to produce reconstructed image blocks 103. As described below, the motion compensation 130 uses low-resolution blocks (LRB) 104 stored in a frame memory 140. The reconstructed blocks 103 can be send to an output device 180 for display.

The invention utilizes the low-resolution reference blocks 104 for the reconstruction of a current blocks due to size constraints of the frame memory 140. The low-resolution reference blocks are produced by a constrained DCT (CDCT) 150, filtering and indexing 200, described in greater detail below. The low-resolution reference blocks are stored in the dedicated frame memory 140. Due to memory size constraints, the reference blocks are transformed into a low-resolution format instead of using full-resolution image blocks to convert the reference video frame, as in the prior art.

Unlike prior art approaches that use YCbCr values of the video frame, the invention uses transformed coefficients stored in the frame memory 140. For each reconstructed block 103, the corresponding constrained DCT (CDCT) coefficients are determined as a reference for following frames. The number of the CDCT coefficients is less than the number of the original DCT coefficients. The CDCT 150 is a refined version of the DCT such that only the coefficients of a specified pattern of ordered coefficients are determined and assigned as the CDCT coefficients.

In this way, the CDCT definition involves both an ordered pattern of the corresponding DCT coefficients and indexing of these coefficients, as described in greater detail below. The CDCT 150 uses a smaller number of coefficients than a regular DCT, thus the CDCT is proportionally faster. The CDCT does not determine all DCT coefficients, but only the DC coefficients that are necessary to obtain the blocks of the low-resolution reference frame.

The low-resolution frames are inverse indexed 160, and inverse CDCT 170 for the motion compensation 130.

Constrained DCT and Indexing

Figure 2A:
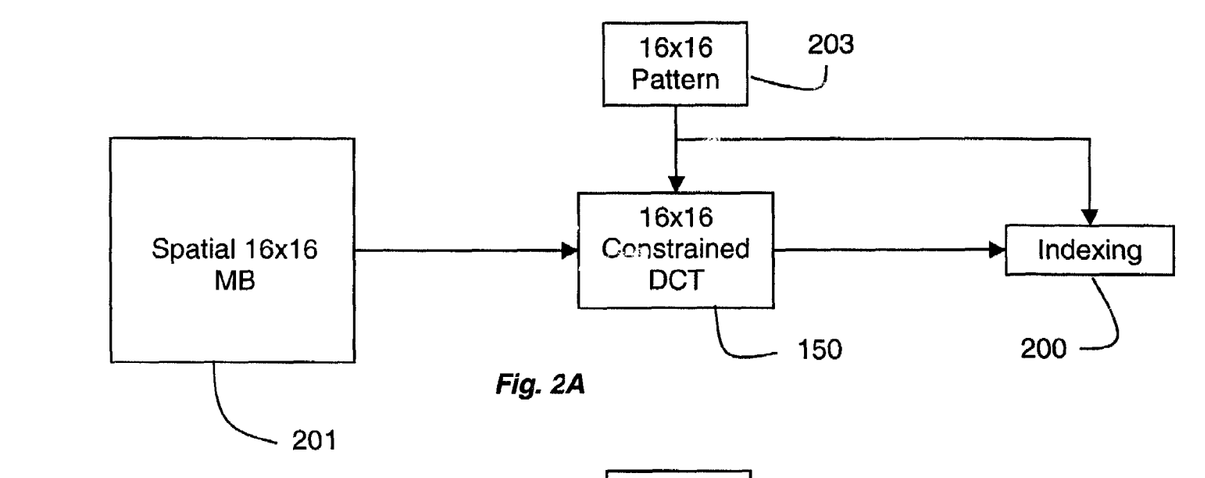
FIG. 2a is a flow diagram of a process for transforming and indexing a 16×16 macroblock according to the invention.
Figure 2B:
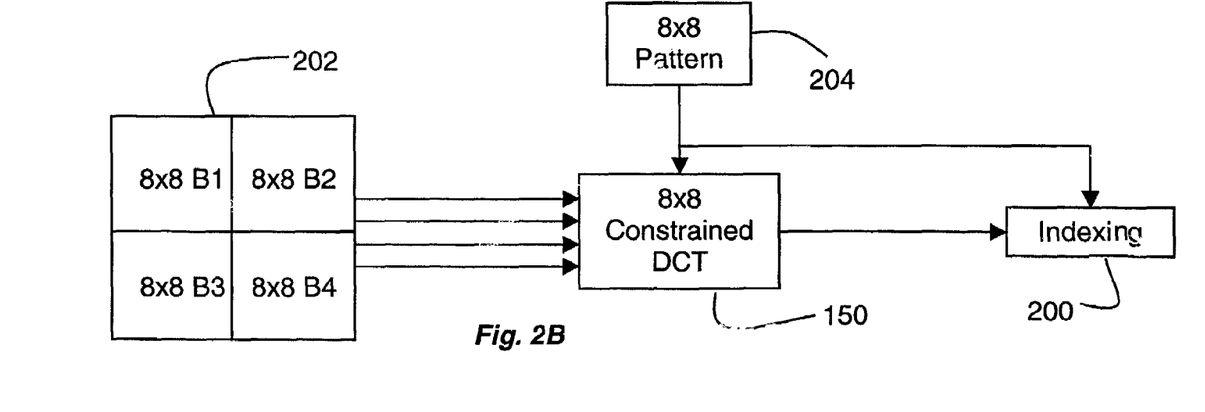
FIG. 2b is a flow diagram of a process for transforming and indexing a group of 8×8 according to the invention.
Figure 3:
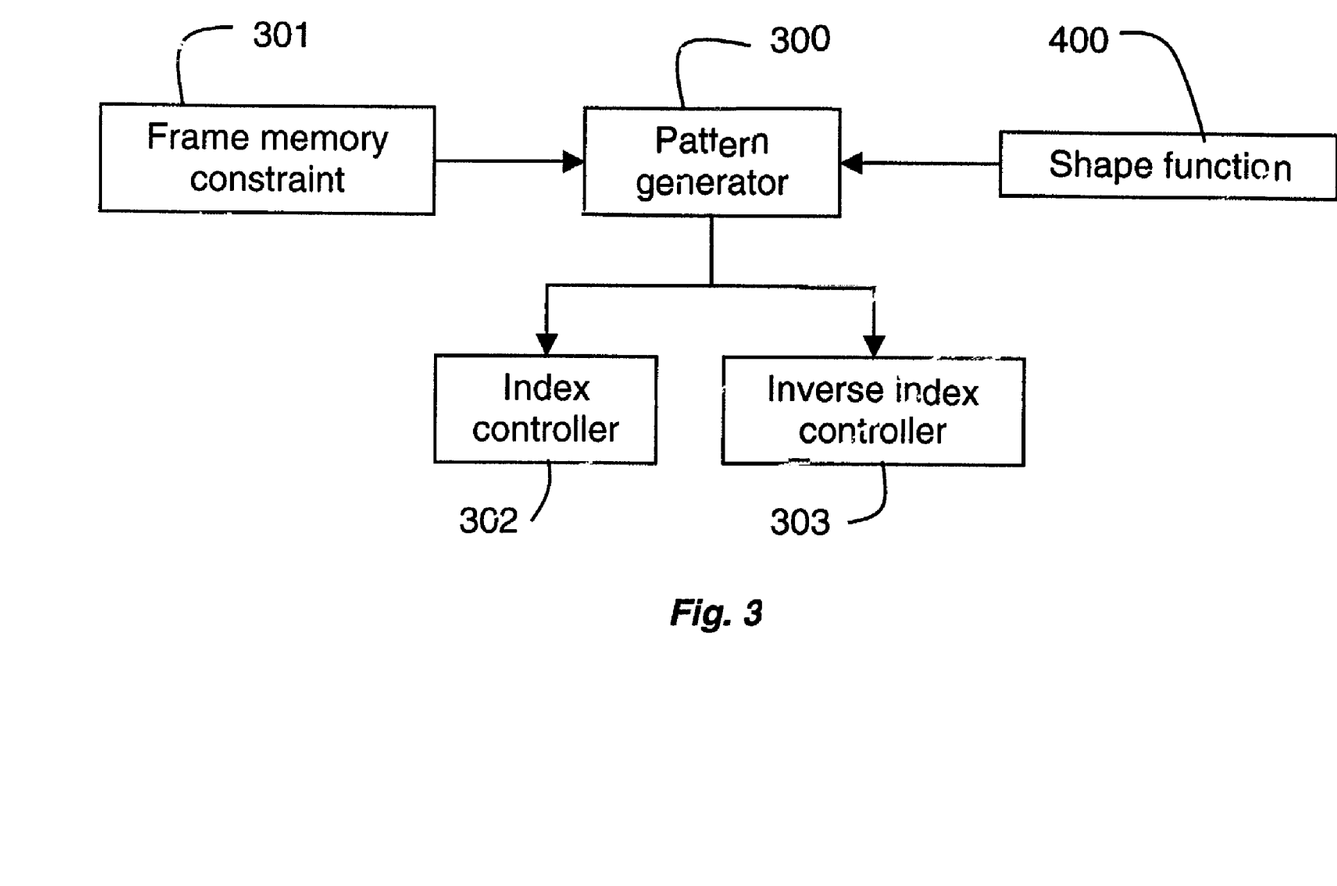
FIG. 3 is a block diagram relating frame memory size constraint, a shaping function, and indexing that are blended in a pattern generator according to the invention.

FIGS. 2*a*–*b* show the CDCT 150 and indexing 200 for indexing a 16×16 macroblock 201, and a group of four 8×8 blocks 202 using patterns 203 and 204, respectively. The patterns 203–204 are generated by a pattern generator 300 as shown in FIG. 3. The patterns can then be used to control 302–303 the indexing 200 and its complementary inverse indexing 160, respectively. Therefore, a pattern P is defined as a list of ordered coefficient locations (u, v)'s, corresponding to pixels, as described below.

The pattern generator 300 determines the ordering of the coefficients. In addition to frame memory constraints 301, the pattern generator 300 uses a sliding shape function 400 for classification.

Shape Function

Figure 4A:
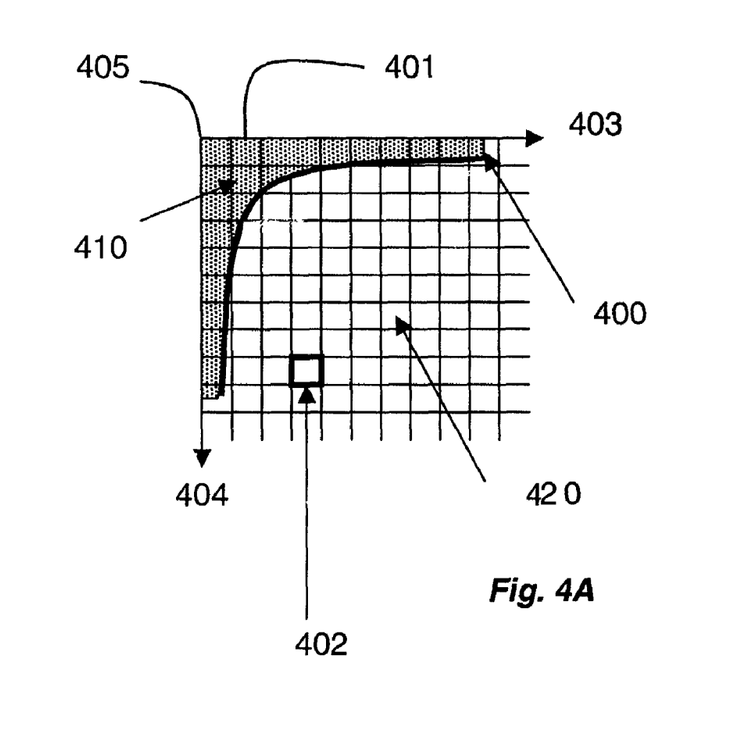
FIG. 4a is a block diagram of block coordinates used by the pattern generator of FIG. 3.

FIG. 4*a* shows the use of the shape function 400 in greater detail below. A block 401 includes pixels 402. The coordinate framework of the pixels includes a u-axis 403, a v-axis 404 with an origin 405. The shape function 400 partitions the block 401 into covered pixels 410, shown cross-hatched, and uncovered pixels 420.

Figure 4B:
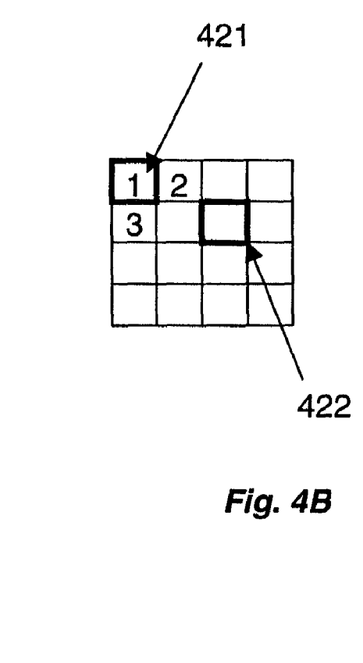
FIG. 4b is a block diagram of marked and unmarked pixels.

FIG. 4*b* shows how zig-zag ordered pixels are either marked 421 or unmarked 422 by the pattern generator 300 as described in greater detail below.

A DCT coefficients is Y(u, v), where (u, v) is its coordinates according to the above framework. The origin 405 of the coordinate system is in the upper left corner which corresponds (u, v)=(0, 0). The dimensions of the block is N×N, i.e., $$0 \leq u < N$$

$$0 < v < N$$

The horizontal and vertical directions represent the u-axis 403 and the v-axis 404, respectively. The shape function $f$(u, v) 400 can be defined by $$f(u, v) = \begin{cases} 1 & u, v \in S \\ 0 & \text{else,} \end{cases}$$

where S is a set of conditions on coordinates (u, v). Because the human visual system is more sensitive to horizontal and vertical lines than the diagonal lines, the pattern generator 300 selects the coefficients of the pixels in the first column and the first row. These pixels corresponds to horizontal and vertical image lines respectively. The shape function 400 is diagonally symmetrical to equally weight the horizontal and vertical spatial frequencies $$f(u,v)=f(v,u).$$

This is a basic condition of the set S.

Figure 7A:
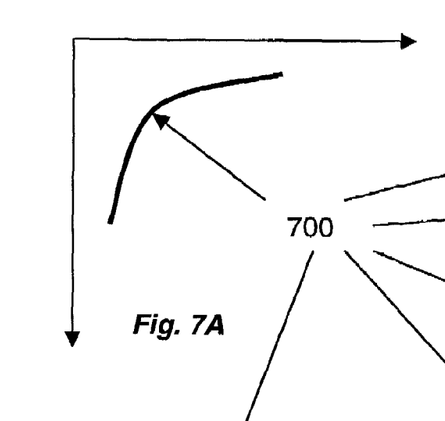
FIGS. 7a–f are graphs of example shape functions.
Figure 7B:
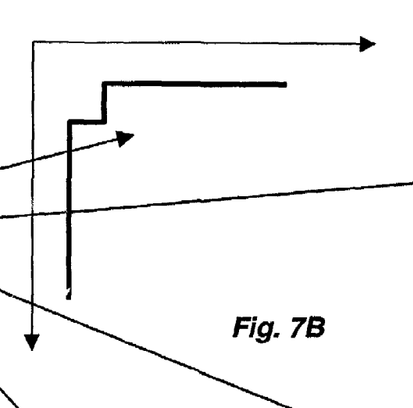
Figure 7C:
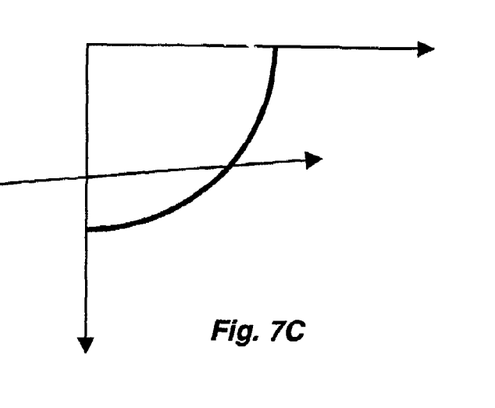
Figure 7D:
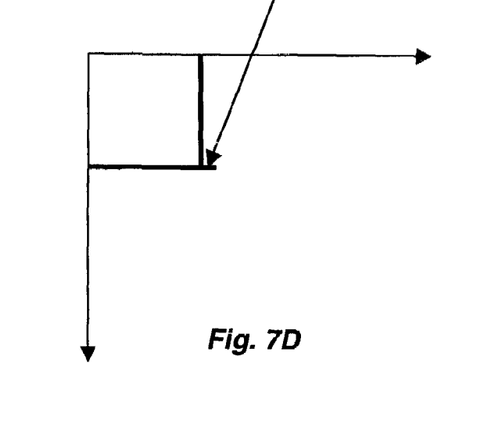
Figure 7E:
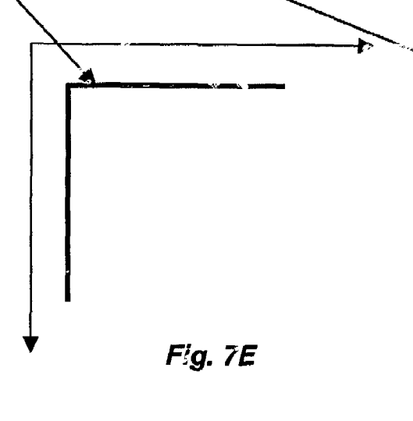
Figure 7F:
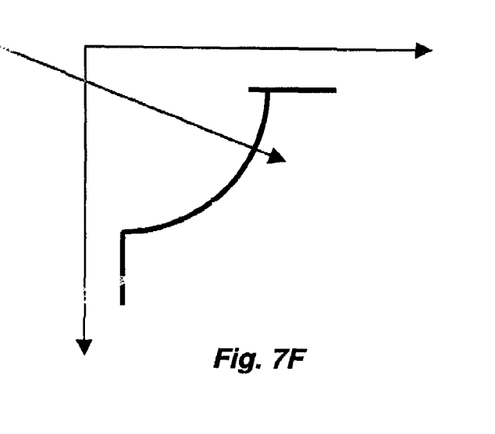

FIGS. 7*a*–*f* show some example shape functions, in order:

$$f(u, v) = \begin{cases} 1 & \frac{u+k}{v+k} = 1 \\ 0 & \text{else,} \end{cases}$$

$$f(u, v) = \begin{cases} 1 & \begin{cases} [(u = k) \wedge (v > 2k)] \text{ or } [(v = k) \wedge (u > 2k)] \text{ or} \\ [(u = 2k) \wedge (2k > v > k)] \text{ or } [(v = 2k) \wedge (2k > u > k)] \end{cases} \\ 0 & \text{else,} \end{cases}$$

$$f(u, v) = \begin{cases} 1 & u^2 + v^2 = k^2 \\ 0 & \text{else,} \end{cases}$$

$$f(u, v) = \begin{cases} 1 & [(u = k) \wedge (v < k)] \text{ or } [(v = k) \wedge (u < k)] \\ 0 & \text{else,} \end{cases}$$

$$f(u, v) = \begin{cases} 1 & [(u = k) \wedge (v > k)] \text{ or } [(v = k) \wedge (u > k)] \\ 0 & \text{else,} \end{cases} \text{ and}$$

$$f(u, v) = \begin{cases} 1 & \begin{matrix} [(u = k) \wedge (v > ck)] \text{ or } [(v = k) \wedge (u > ck)] \text{ or} \\ u^2 + v^2 = c^2 k^2 \end{matrix} \\ 0 & \text{else,} \end{cases}$$

where k and c are constant numbers. Each of these shape function has a unique point 700 such that $f$(i, i)=1. The point (i, i) 700 is called as center of symmetry.

The coefficients that are in the area bounded between the axes 403–404 and the shape function 400 are defined as covered coefficients of the covered pixels 410.

Pattern Generation

Figure 5:
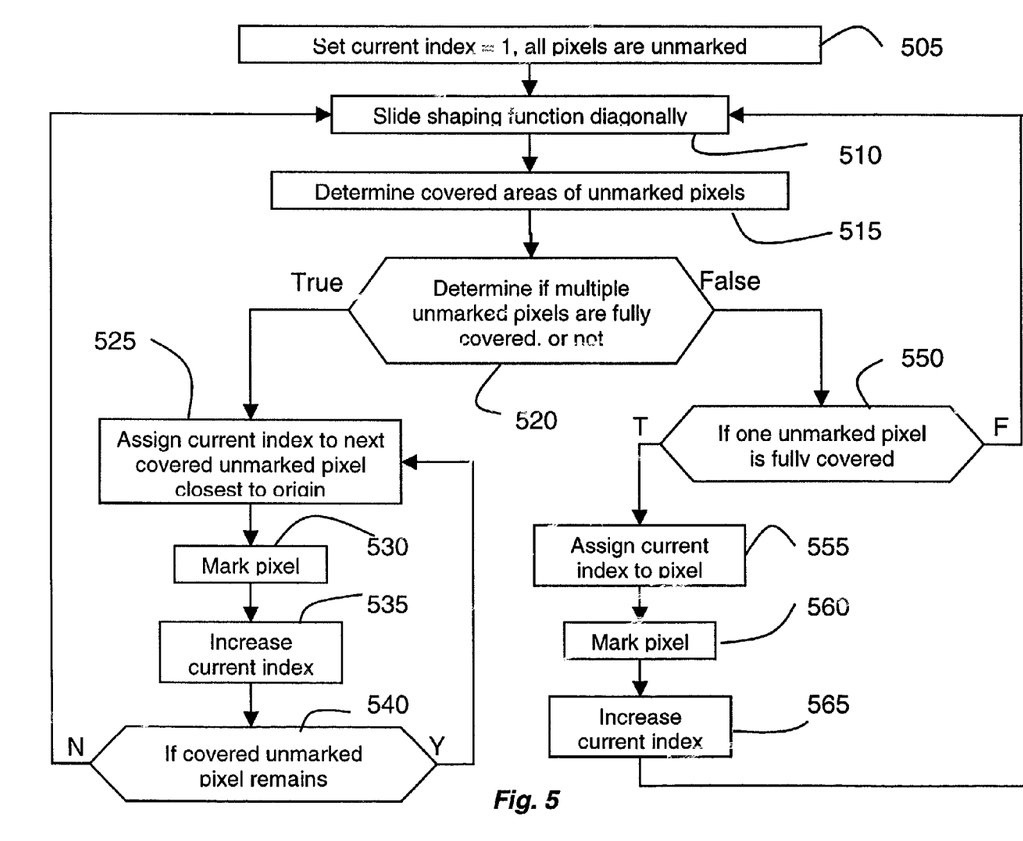
FIG. 5 is a flow diagram of the pattern generator according to the invention.

FIG. 5 show the details of generating a pattern P as a list of ordered coefficient locations (u, v)'s, called as pixels. The procedure is as follows. Set 505 the current index to one (h=1), and assign all pixels as unmarked. Set the center of symmetry 700 of the shape function 400 to the origin 405.

Slide 510 the shape function diagonally. Determine 515 the covered areas 410 of unmarked pixels 421.

Determine 520 whether multiple unmarked pixels are fully covered, or not.

If step 520 is true, then measure the distance from the origin for fully covered unmarked pixels, and assign 525 the current index to the next covered unmarked pixel that is closest to the origin, i.e., P(h)=(u, v) where (u, v) is the closest, covered, unmarked pixel, mark pixel 530, increase 535 the current index number according to h=h+1. If covered unmarked point remains 540, go to step 525, else go to step 510.

If step 520 is false, determine 550 whether only one unmarked pixel is fully covered, and go to step 510 is false. Else, assign 555 current index to the next covered unmarked pixel, i.e., P(h)=(u, v), where (u, v) is the covered, unmarked pixel, mark 560 pixel, and increase 565 current index number (h=h+1), if there still are unmarked pixels go to step 510.

The pattern generator produces a list of ordered coefficient locations such that $$\{P(1), P(2), \ldots, P(N \times N)\} = \{(u_1, v_1), (u_2, v_2), \ldots (u_{N \times N}, v_{N \times N})\}.$$

The ordered DCT coefficients up to the constrained memory size are selected and saved into a memory.

Sliding Shape Function

Figure 6:
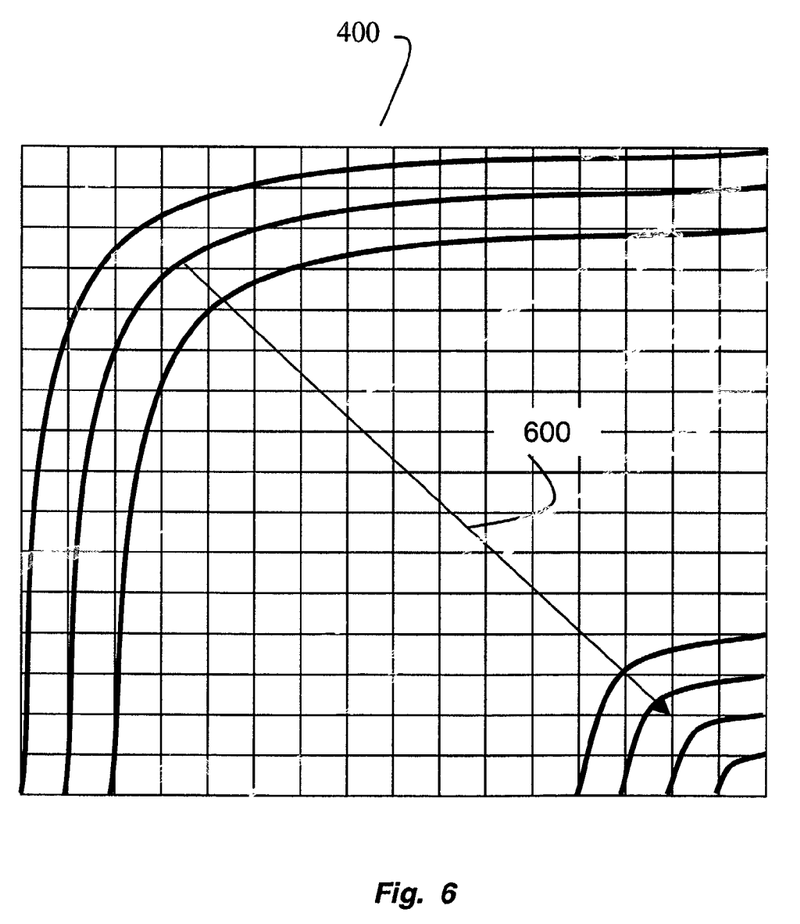
FIG. 6 is a block diagram of a sliding shape function to determine an ordering of coefficients according to the invention.
Figure 8A:
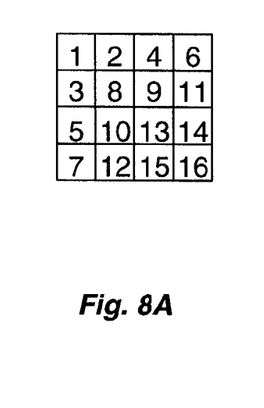
FIGS. 8a–c are block diagrams of 4×4, 8×8, and 16×16 uncompleted blocks, respectively.
Figure 8B:
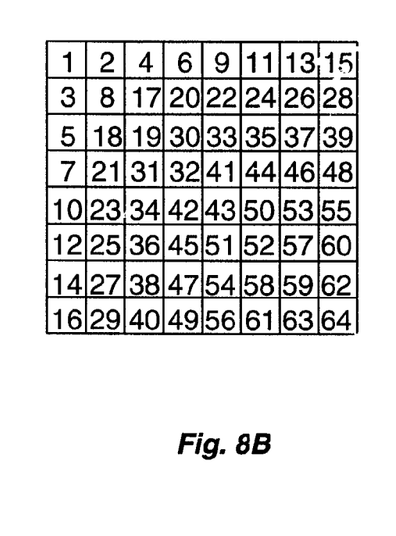
Figure 8C:
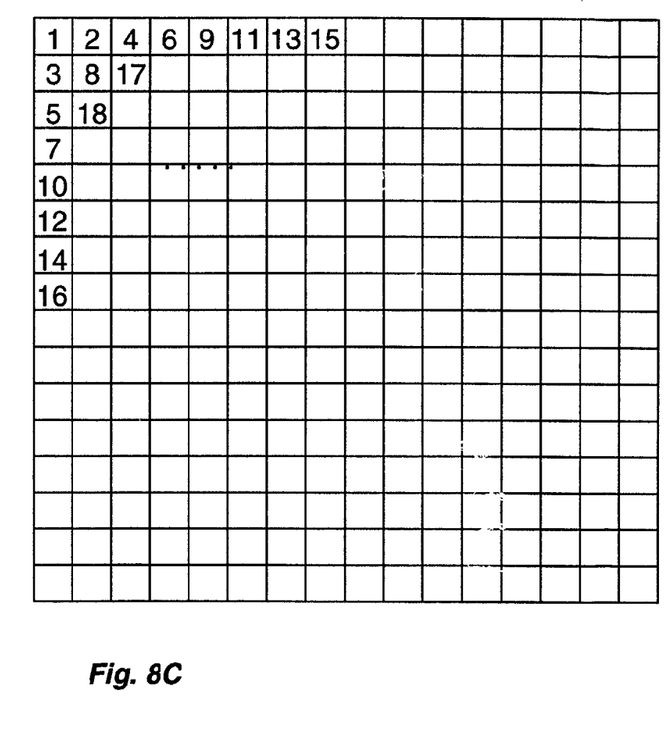

FIG. 6 shows the sliding 600 of the shape function 400, and FIGS. 8*a*–*c* show sample generated zig-zag patterns.

Indexing

The constrained size of the frame memory 140 is K, which is the total number of coefficients that can be stored in the constrained size frame memory at one time. These coefficients can be assigned as 8-bit, 12-bit, or any number of bits depending to the data structures of the implementation. The first K coefficients are $$\{P(1), P(2), \ldots, P(K)\} = \{(u_1, v_1), (u_2, v_2), \ldots (u_K, v_K)\}$$

Then, the CDCT for an N×N block is defined as $$Y(u_k, v_k) = \frac{2c_{uk}c_{vk}}{N} \sum_{m=0}^{N-1} \sum_{n=0}^{N-1} y(m, n) F_{2N}^{uk}(m) F_{2N}^{vk}(n),$$

where $(u_k, v_k) = P(k)$, and $1 \leq k \leq K$.

Before writing the CDCT coefficients to the constrained size frame memory 140, they are indexed to match the constrained size of the frame memory 140. Because common memory architectures utilize block formats, the coefficients are arranged in a block form. We denote indexing function as Q $$P(k) \rightarrow Q(P(k)).$$

The inverse indexing is reciprocal to the indexing. Inverse indexing transfers the indexed coefficients to their original locations in a DCT block as $$Q^{-1}(Q(P(k))) \rightarrow P(k).$$

The coefficients are read from the frame memory 140 and inverse indexed to their original locations. To reconstruct the reference image block, the inverse constraint DCT 170 is applied to the coefficient block $$y(m, n) = \frac{2}{N} \sum_{k=1}^{K} c_{uk} c_{vk} Y(u_k, v_k) F_{2N}^{uk}(m) F_{2N}^{vk}(n).$$

Decoding Loop

Figure 9:
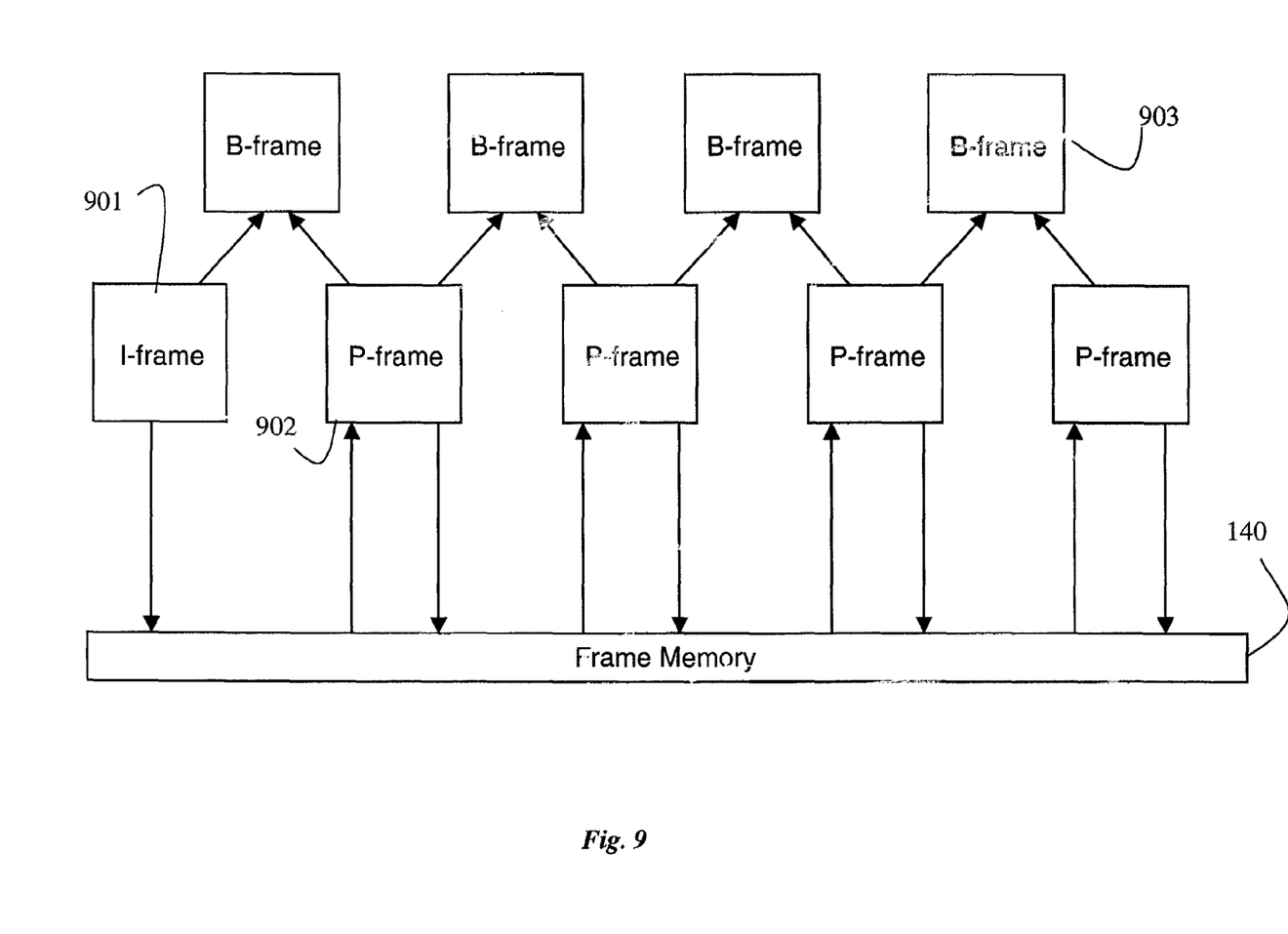
FIG. 9 is a block diagram of frames stored in a frame memory according to the invention.

FIG. 9 shows access to the frame memory 140 for CDCT coefficients for an MPEG coded bitstream. The initial CDCT coefficients of an intra-frame (I-frame) 901 are written to the frame memory 140. In the bitstream, the I-frames are encoded only with respect to themselves. Thus, no CDCT coefficients are read from the frame memory for an I-frame.

The predicted frames (P-frames) 902 are estimated by using the block-wise motion vectors that are parsed from the bitstream. In the encoder, these frames are encoded using motion compensated prediction from a previous I-picture or P-picture. A prediction error is calculated between blocks in the current picture and a previous reference I- or P-frame. An intermediate frame is reconstructed from the CDCT coefficients that are currently available in the frame memory. A current frame is then estimated by motion compensation using the intermediate frame and motion vectors that are parsed from the video bitstream. The CDCT coefficients are read from the frame memory and inverse CDCT is applied to obtain the intermediate frame. The current frame is used as a reference frame when decoding the next P-frame. After CDCT coefficients are computed for the current frame, these coefficients written to the frame memory.

Bi-directional frames (B-frames) 903 are encoded using the motion compensated predictions from a previous and/or a next I- or P-frame. However, in the decoder no CDCT coefficients read directly from the frame memory for reconstruction of B-frames. Instead, the I- or P-frames are used.

Single 16×16 Macroblock and Quadruple 8×8 Blocks Implementations

Figure 10A:
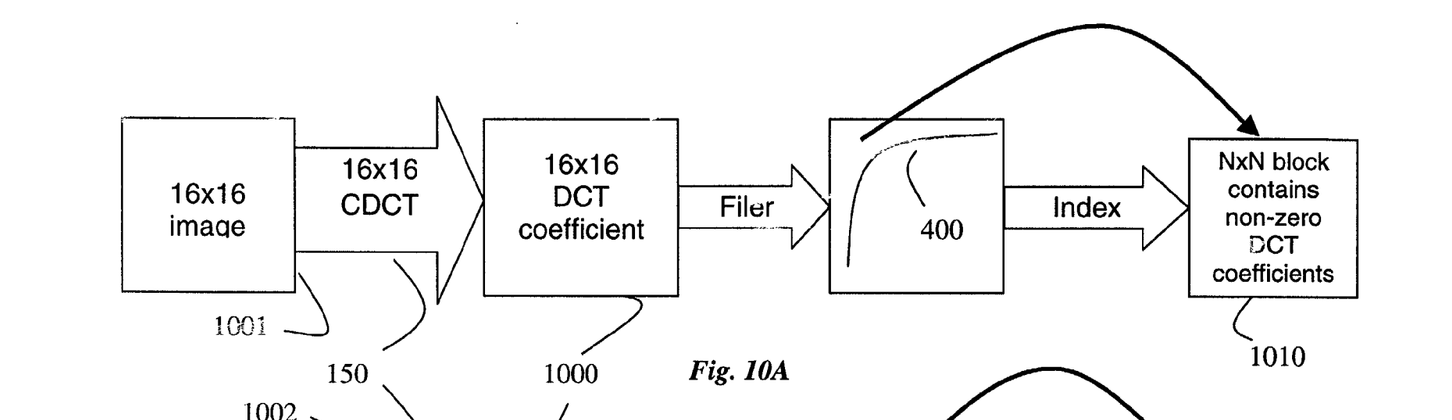
FIGS. 10a–b are flow diagrams of a spatial reduction process for 16×16 and 8×8 blocks, respectively.
Figure 10B:
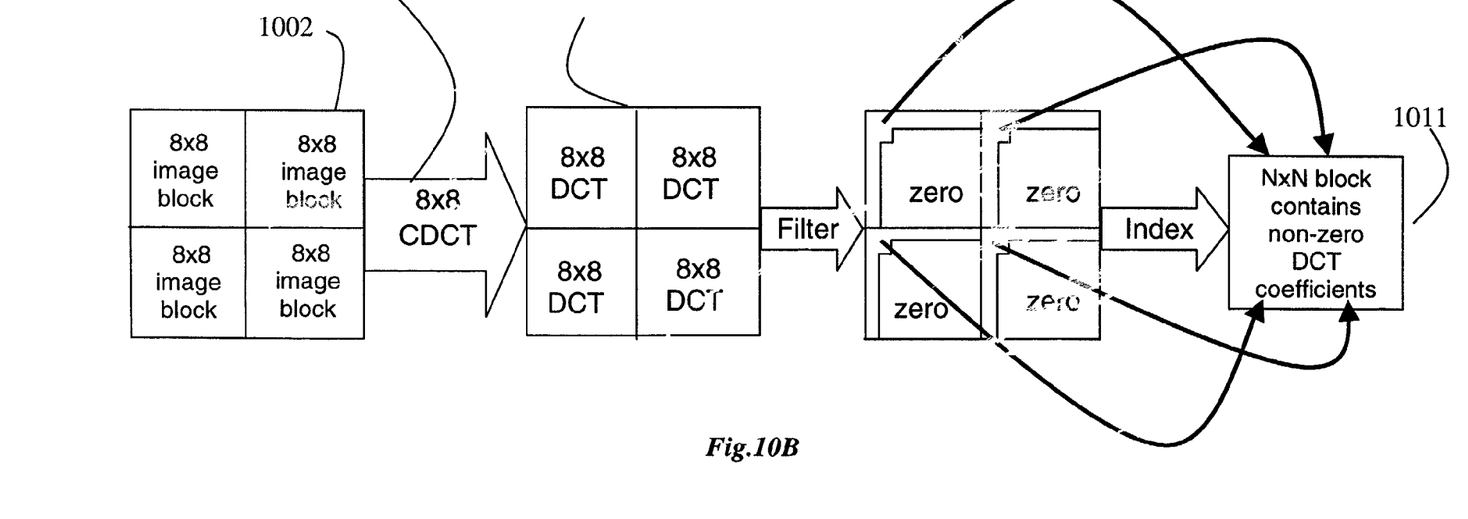

FIGS. 10*a*–*b* shows spatial reduction process using single 16×16 macroblock, and quadruple 8×8 blocks according to the invention. However, other block sizes can also be used.

The CDCT 150 can be represented as consecutive blocks of computation of discrete cosine transform coefficients 1000, filtering and indexing. In a single macroblock case (FIG. 10*a*), transform coefficients are determined by applying a 16×16 DCT to the input macroblock 1001. These coefficients are ordered with respect to the pattern generated by the specified shape function 400. Then, the ordered coefficients are filtered to satisfy the memory size constraints. The indexing arranges the filtered coefficients into a N×N block 1010, where N<16. The block arrangement is utilized due to the memory size constraints. These operations are all unified in the CDCT.

Improvement in the down-sizing/up-sizing process can be achieved by using smaller DCT kernels. Also, for an interlaced video, the encoding process considers using smaller 8×8 or 8×16 blocks. Therefore instead of a macroblock, a set of quadruple 8×8 blocks 1002 is used in the decoding process with respect to encoding specifications. The 8×8 DCT coefficients are computed for each 8×8 block. A pattern for 8×8 block size is generated using the specified shape function 400. The coefficients of each block are ordered with respect to the pattern separately. Identical filters are applied to the each ordered coefficient list. The filter cut-off number is the one-forth of the original filter cutoff number that is used for macroblock case. The indexing then arranges all of the filtered coefficients of the four blocks into a single N×N block 1011, as above.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding a video encoded as a compressed bitstream encoded as a plurality of blocks, comprising:
   variable length decoding and inverse quantizing the bitstream to determine motion vectors and DCT coefficients of the blocks of the bitstream;
   inverse discrete cosine transforming the DCT coefficients to produce reconstructed blocks;
   generating, for each reconstructed block, a low-resolution block of the DCT coefficients constructed according to an ordered pattern determined by a shape function, wherein a number of DCT coefficients of the low-resolution blocks is less than a number of the DCT coefficients of the reconstructed blocks; and
   motion compensating the reconstructed blocks with the low-resolution blocks to decode the video, wherein each reconstructed block includes a plurality of pixels, and the shape function partitions the reconstructed block into covered pixels and uncovered pixels.

2. The method of claim 1 wherein the low-resolution blocks are stored in a frame memory having a constrained size.

3. The method of claim 2 wherein the generating further comprises:
   discrete cosine transforming the DCT coefficients according to a constrained size of the frame memory; and
   filtering and indexing the transformed DCT coefficients.

4. The method of claim 3 wherein the motion compensating further comprises:
   inverse indexing the low-resolution blocks; and
   inverse discrete cosine transforming the indexed low-resolution blocks according to the constrained size of the frame memory.

5. The method of claim 1 wherein the shape function $f(u, v)$ is selected from a group consisting of:

$$f(u, v) = \begin{cases} 1 & \frac{u+k}{v+k} = 1 \\ 0 & \text{else}, \end{cases}$$

$$f(u, v) = \begin{cases} 1 & \begin{cases} [(u = k) \wedge (v > 2k)] \text{ or } [(v = k) \wedge (u > 2k)] \text{ or} \\ [(u = 2k) \wedge (2k > v > k)] \text{ or } [(v = 2k) \wedge (2k > u > k)] \end{cases} \\ 0 & \text{else}, \end{cases}$$

$$f(u, v) = \begin{cases} 1 & u^2 + v^2 = k^2 \\ 0 & \text{else}, \end{cases}$$

$$f(u, v) = \begin{cases} 1 & [(u = k) \wedge (v < k)] \text{ or } [(v = k) \wedge (u < k)] \\ 0 & \text{else}, \end{cases}$$

$$f(u, v) = \begin{cases} 1 & [(u = k) \wedge (v > k)] \text{ or } [(v = k) \wedge (u > k)] \\ 0 & \text{else}, \end{cases} \text{ and}$$

$$f(u, v) = \begin{cases} 1 & \begin{matrix} [(u = k) \wedge (v > ck)] \text{ or } [(v = k) \wedge (u > ck)] \text{ or} \\ u^2 + v^2 = c^2 k^2 \end{matrix} \\ 0 & \text{else}, \end{cases}$$

where k and c are constant numbers, and u and v are coordinates of the DCT coefficients, and dimensions of each block is N×N.

6. The method of claim 5 wherein the shape function has a center of symmetry such that $f(i, i) = 1$.

7. The method of claim 5 wherein the ordered pattern of DCT coefficients is $$\{P(1), P(2), \ldots, P(N \times N)\} = \{(u_1, v_1), (u_2, v_2), \ldots (u_{N \times N}, v_{N \times N})\}.$$

8. The method of claim 7 wherein the first K coefficients are $$\{P(1), P(2), \ldots, P(K)\} = \{(u_1, v_1), (u_2, v_2), \ldots (u_K, v_K)\}.$$

9. The method of claim 8 wherein the constrained CDCT for the N ×N block are $$Y(u_k, v_k) = \frac{2c_{uk}c_{vk}}{N} \sum_{m=0}^{N-1} \sum_{n=0}^{N-1} y(m, n) F_{2N}^{uk}(m) F_{2N}^{vk}(n),$$

where $(u_k, v_k) = P(k)$, and $1 \leq k \leq K$.

* * * * *